Patented July 22, 1941

2,249,916

UNITED STATES PATENT OFFICE 2,249,916

VINYLIDENE CHLORIDE COMPOSITIONS

Robert C. Reinhardt and John H. Reilly, Midland, Mich., assignors to The Dow Chemical Company, Midland, Mich., a corporation of Michigan No Drawing. Original application November 16, 1938, Serial No. 240,661. Divided and this application November 28, 1940, Serial No. 367,576

4 Claims. (Cl. 260—32)

This invention relates to useful liquid dispersions or solutions of polymerized and co-polymerized vinylidene chloride.

The problem of preparing solutions or dispersions (herein referred to simply as solutions) of vinylidene chloride polymers and co-polymers is rendered difficult by the fact that such of the said polymeric bodies as dissolve readily in many of the common solvents are either too unstable or too low melting to be generally useful or desirable as ingredients of surface-coating compositions, and the like. The converse is also true, i. e., the vinylidene chloride polymeric products which are sufficiently stable, and which have high enough softening points to be otherwise acceptable as plastics, are insoluble in the usual solvents, such as chloroform, carbon bisulfide, ethylene bromide, or benzene, even at boiling temperature, and are only sparingly soluble in tetrachloroethane.

The polymer of pure vinylidene chloride (monomer boils at 31.5°–32° C.), which is insoluble in the above-named solvents, has a softening point at or above 170° C., is stable at temperatures of about 210° C., or higher, and is substantially unchanged in composition when heated in a glass container at 180° C. The co-polymers, whose softening points are above 130° C., are prepared by polymerizing pure monomeric vinylidene chloride with a minor proportion of vinyl chloride, vinyl or other unsaturated esters or carboxylic acids, esters of acrylic or methacrylic acids, or styrene, and the like. These co-polymers are also insoluble in the solvents named above and are stable at temperatures at least 10 degrees above their respective softening points. The co-polymers having best properties for surface-coating, film-, thread-, or filament-forming, and similar purposes, are those wherein the co-polymerized ingredient contains only one active ethylenic group. By the expression "active ethylenic group" is meant a carbon-to-carbon double bond, which enters into the co-polymeric structure under the polymerization conditions employed. In order to utilize these co-polymers for the specific purposes, however, it is necessary that solutions of the same be made available.

It is among the objects of the invention to provide solutions or dispersions comprising the polymer of pure vinylidene chloride (boiling point 31.5°–32° C.) and/or high-softening co-polymers thereof with co-polymerizable compounds containing only one active ethylenic group, which are suitable for use in the preparation of lacquers, films, threads, filaments and powders of the said polymer or co-polymer.

We have now found that the polymer of pure vinylidene chloride and the high-softening co-polymers wherein the co-polymerized ingredient contains only one active ethylenic group, although substantially insoluble in boiling chloroform, carbon bisulfide, ethylene bromide or benzene, may be made to form clear dispersions or solutions in certain selected solvents, which are useful in the preparation of lacquers, films and filaments, etc. The solvents which we have found satisfactory for this purpose are non-polar liquids boiling above 100° C., examples of which are the liquid polychlorinated aromatic hydrocarbons, the liquid (aliphatic, alicyclic, and alkyl-aryl) ketones, and the (open-chain and cyclic) aliphatic ethers. Suitable polychlorinated hydrocarbons are: ortho-dichlorobenzene, trichlorobenzene, ethyl-dichlorobenzene, and the like. The useful ketones boiling above 100° C. include methyl-isobutyl-ketone, mesityl oxide, cyclohexanone, heptanone-2, acetophenone, etc. Ethers which are useful include dichloro-diethyl ether, 1,4-dioxane, 1,3 dioxane, and similar aliphatic ethers, boiling above 100° C.

The solutions are prepared by heating the polymer or co-polymer with one or a mixture of the solvents of the previously named classes. Many of the solvents named, including ortho-dichlorobenzene and trichlorobenzene, retain the polymer in clear solution only at temperatures above 140° C., below which temperature the composition becomes a gel. Hence, when the boiling point of the solvent employed permits of such temperatures, 140° C. is a good temperature at which to prepare solutions. In all cases when the polymer or co-polymer is dissolved or dispersed in a solvent of the class named, the resulting dispersion while hot has the appearance of a true solution. When cooled, however, it may in some cases take on the appearance of a colloidal gel. If desired, plasticizers may be added to the solutions.

The following are examples of compositions embodying the invention:

Example 1

The polymer of pure vinylidene chloride (20 grams) is heated with trichlorobenzene (100 cc.) to a temperature of about 160°–170° C. The polymer dissolves in the trichlorobenzene, and remains in clear solution at temperatures above 143° C. Clear tough flexible films are formed by spreading the solution, at 150° C., on a surface heated to 140° C., and drying the film.

Example 2

Twenty grams of a co-polymer consisting of 70 per cent vinylidene chloride and 30 per cent vinyl acetate is dissolved in 80 grams of 1.4-dioxane, by warming.

Example 3

A 5 per cent solution in dioxane was prepared from a high-softening co-polymer of 70 per cent vinylidene chloride and 30 per cent vinyl chloride, and to the solution was added 1 per cent of diphenyl-mono-orthoxenyl phosphate as a plasticizer. The solution was spread on a glass plate from a standard film caster and was dried in a film drier at 50° C. The foil produced was about 0.0005 inch thick, nearly transparent, very tough and rubbery, and quite insoluble in organic solvents at room temperature. It could be redissolved readily in dioxane, cyclohexanone, or mesityl oxide by heating.

Example 4

In a manner similar to Example 3, films were made from high-softening co-polymers of vinylidene chloride with ethyl acrylate, methyl methacrylate and styrene, respectively, employing cyclohexanone as the solvent.

The following table illustrates the preparation of lacquers from vinylidene chloride co-polymers. A number of co-polymers were dissolved to form 5 per cent solutions in dioxane. The dilution ratio of the dioxane solutions with various lacquer solvents and thinners was determined, and it was found that substantial volumes of lacquer diluents could be added, while still retaining the co-polymer in solution.

| Diluent | Softening point of resin, °C. | Maximum volume ratio, diluent: dioxane solution |
|---|---|---|
| Carbon tetrachloride | 132 | 2.0 |
| Toluene | 132 | 3.1 |
| Naphtha | 132 | 0.7 |
| Carbon tetrachloride | 143 | 2.3 |
| Toluene | 143 | 4.1 |
| Naphtha | 143 | 0.74 |
| Carbon tetrachloride | 154 | 1.0 |
| Toluene | 154 | 1.3 |
| Naphtha | 154 | 0.6 |
| Water | 143 | 0.05 |
| Alcohol, denatured, 95% | 132 | 0.3 |

Lacquer films deposited from such solutions have no visible crystal structure when examined under a microscope at 900× magnification. The films are tough, fire-resistant, excellent dielectrics, and are not attacked by acids, alkalies, salts, polar organic solvents, or by most non-polar solvents at ordinary temperatures.

The herein described solutions of the polymer of pure vinylidene chloride and of the high-softening co-polymers thereof are adapted to the preparation of surface-coating compositions and for making of foils, filaments, molding powders and the like in known manner. When the solution is to be employed at low temperature, such solvents as dioxane, cyclohexanone, acetophenone, heptanone-2, methyl-isobutyl-ketone, and the like, or mixtures thereof, are satisfactory. If the solutions are employed at high temperatures as, for example, in the casting of films, trichlorobenzene and ortho-dichlorobenzene are preferred solvents.

This application is a division of our co-pending application, Serial No. 240,661, filed November 16, 1938, which, in turn, is a continuation-in-part of our earlier application, Serial No. 151,182, filed June 30, 1937.

We claim:

1. A composition of matter comprising (1) a polymeric material which is insoluble in chloroform, carbon bisulfide, ethylene bromide, and benzene, said material having a softening point above 130° C., being thermo-stable at least to its softening point, and being selected from the group consisting of the polymer of pure vinylidene chloride and co-polymers thereof containing only a minor proportion of a co-polymerized ingredient having only one active ethylenic group, completely dispersed to form a solution in (2) a liquid polychlorinated aromatic hydrocarbon, which solution remains clear at temperatures above about 140° C., and forms gels at lower temperatures.

2. A composition of matter comprising (1) a polymeric material which is insoluble in chloroform, carbon bisulfide, ethylene bromide, and benzene, said material having a softening point above 130° C., being thermo-stable at least to its softening point, and being selected from the group consisting of the polymer of pure vinylidene chloride and co-polymers thereof containing only a minor proportion of a co-polymerized ingredient having only one active ethylenic group, completely dispersed to form a solution in (2) trichlorobenzene, which solution remains clear at temperatures above about 140° C., and forms gels at lower temperatures.

3. A composition of matter comprising (1) a polymeric material which is insoluble in chloroform, carbon bisulfide, ethylene bromide, and benzene, said material having a softening point above 130° C., being thermo-stable at least to its softening point, and being selected from the group consisting of the polymer of pure vinylidene chloride and co-polymers thereof containing only a minor proportion of a co-polymerized ingredient having only one active ethylenic group, completely dispersed to form a solution in (2) ortho-dichlorobenzene, which solution remains clear at temperatures above about 140° C., and forms gels at lower temperatures.

4. A composition of matter comprising (1) a polymeric material which is insoluble in chloroform, carbon bisulfide, ethylene bromide, and benzene, said material having a softening point above 130° C., being thermo-stable at least to its softening point, and being selected from the group consisting of the polymer of pure vinylidene chloride and co-polymers thereof containing only a minor proportion of a co-polymerized ingredient having only one active ethylenic group, completely dispersed to form a solution in (2) ethyl-dichlorobenzene, which solution remains clear at temperatures above 140° C., and forms gels at lower temperatures.

ROBERT C. REINHARDT.
JOHN H. REILLY.